US008789570B2

(12) United States Patent
Portas et al.

(10) Patent No.: US 8,789,570 B2
(45) Date of Patent: Jul. 29, 2014

(54) APPARATUSES FOR DISPOSING TUBULAR COVERING SLEEVES FOR ELECTRIC-CABLE JOINTS ON SUPPORTING ELEMENTS

(75) Inventors: Francesco Portas, Quattordio (IT); Ubaldo Vallauri, Monza (IT)

(73) Assignee: Prysmian Cavi e Sistemi Energia S.R.L., Milan (IT)

( * ) Notice: Subject to any disclaimer, the term of this patent is extended or adjusted under 35 U.S.C. 154(b) by 27 days.

(21) Appl. No.: 13/559,040

(22) Filed: Jul. 26, 2012

(65) Prior Publication Data

US 2013/0061465 A1 Mar. 14, 2013

Related U.S. Application Data

(62) Division of application No. 12/087,123, filed as application No. PCT/IT2005/000768 on Dec. 28, 2005, now Pat. No. 8,273,200.

(51) Int. Cl.
*B29C 65/66* (2006.01)
*B29C 61/08* (2006.01)
*B29C 55/24* (2006.01)

(52) U.S. Cl.
USPC ................. 156/423; 156/494; 29/235; 29/789

(58) Field of Classification Search
USPC .............................. 156/423, 494; 29/235, 789
See application file for complete search history.

(56) References Cited

U.S. PATENT DOCUMENTS

| 3,495,301 | A | * | 2/1970 | Larsen et al. ................. 425/392 |
| 5,052,092 | A | * | 10/1991 | Vallauri et al. ................. 29/234 |
| 5,467,515 | A | | 11/1995 | Luzzi |
| 5,987,745 | A | * | 11/1999 | Hoglund et al. ............... 29/869 |
| 6,472,600 | B1 | | 10/2002 | Osmani et al. |

FOREIGN PATENT DOCUMENTS

| EP | 0 780 948 | 6/1997 |
| WO | WO 02/07280 | 1/2002 |

OTHER PUBLICATIONS

Written Opinion of the International Searching Authority from corresponding International Application PCT/IT2005/000768.

* cited by examiner

*Primary Examiner* — Michael Tolin
(74) *Attorney, Agent, or Firm* — Harness, Dickey & Pierce, PLC

(57) ABSTRACT

An apparatus for disposing a tubular covering sleeve for electric-cable joints on a supporting element may include a support for the tubular covering sleeve; a pair of expanders; driving means configured to introduce the expanders into respective ends of the tubular covering sleeve and to cause radial expansion of the tubular covering sleeve; and devices for disposing the tubular covering sleeve in a radially expanded condition on the supporting element. The expanders may be configured to be placed in substantially coaxial positions relative to the tubular covering sleeve at the respective ends of the tubular covering sleeve.

31 Claims, 11 Drawing Sheets

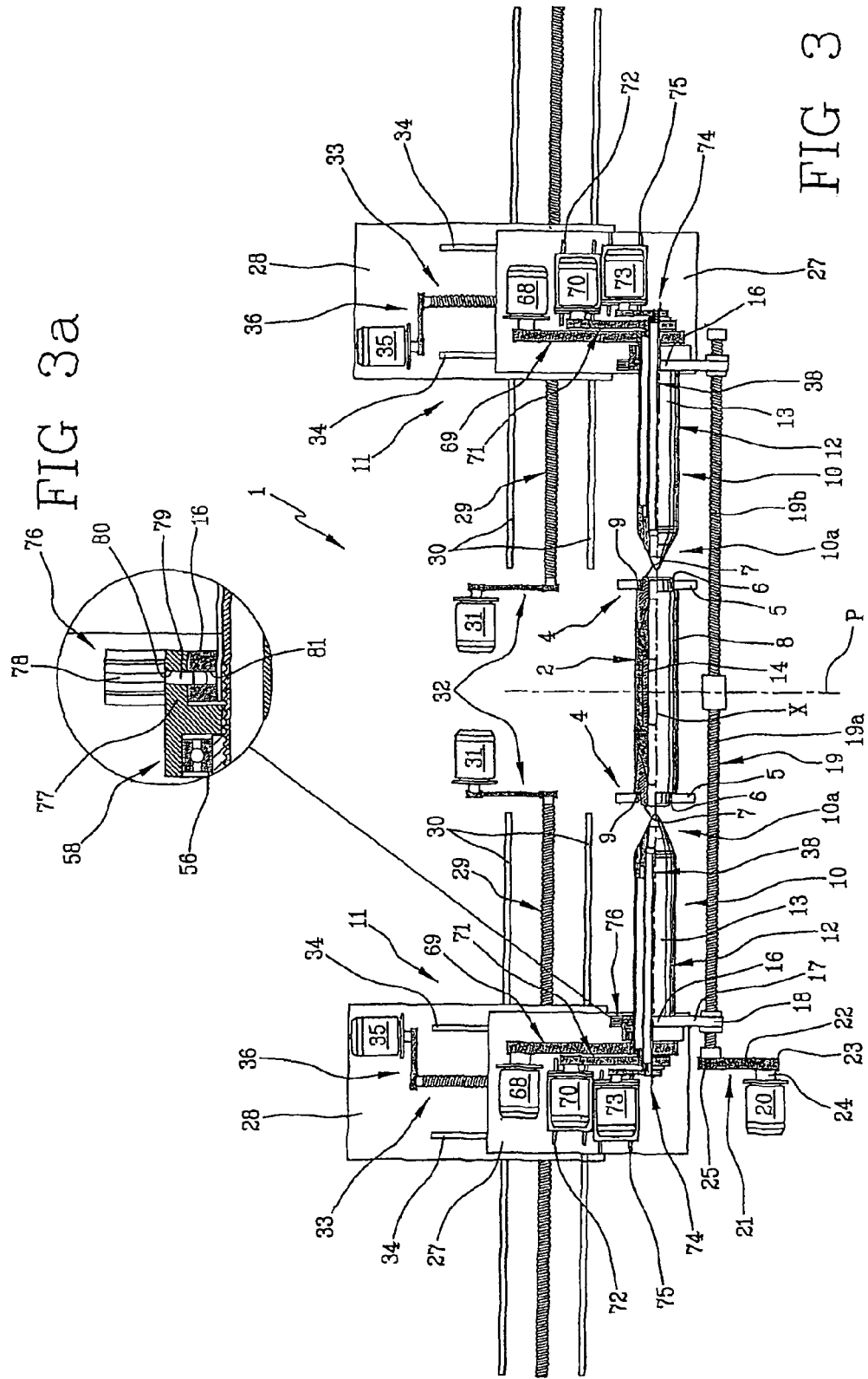

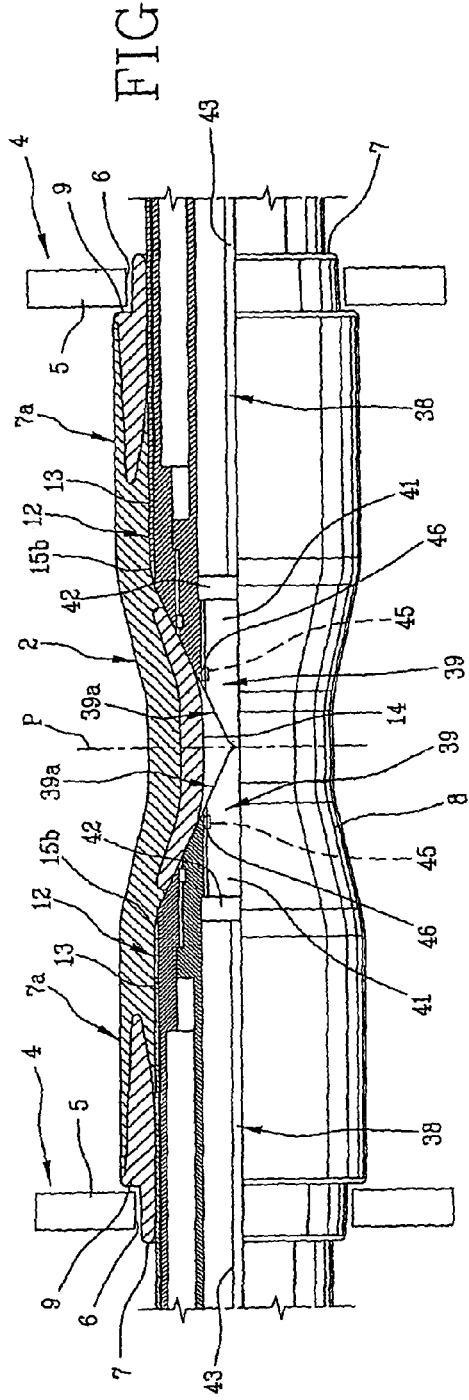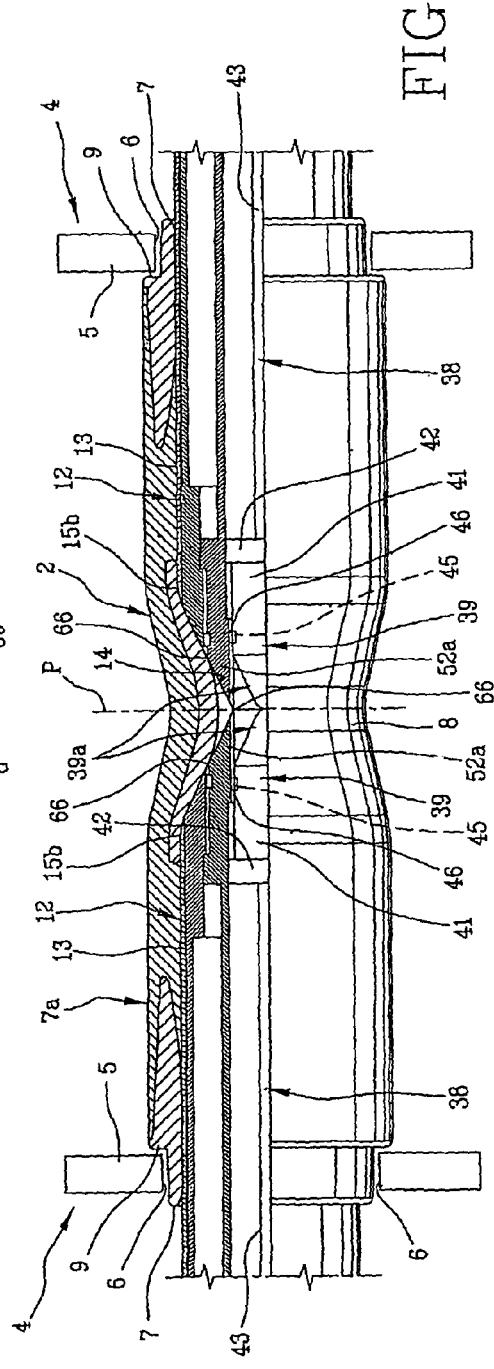

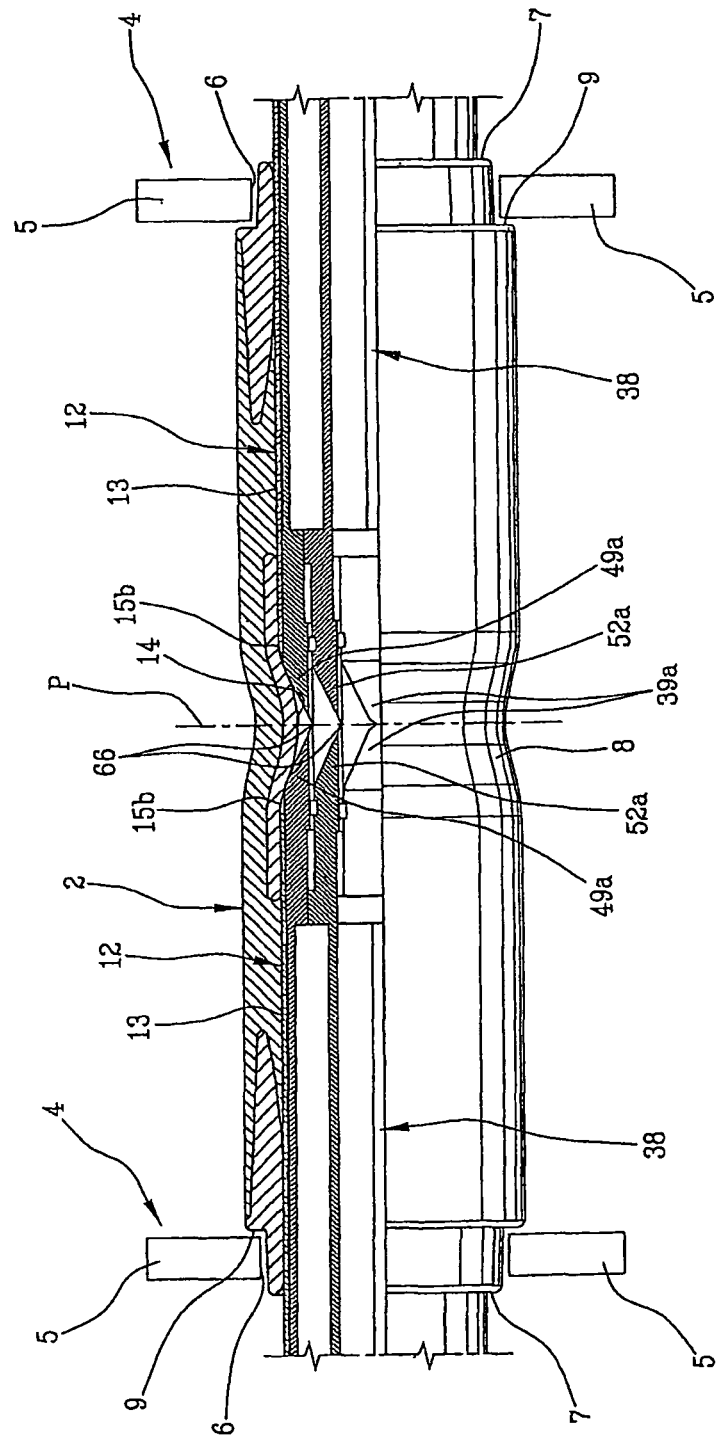

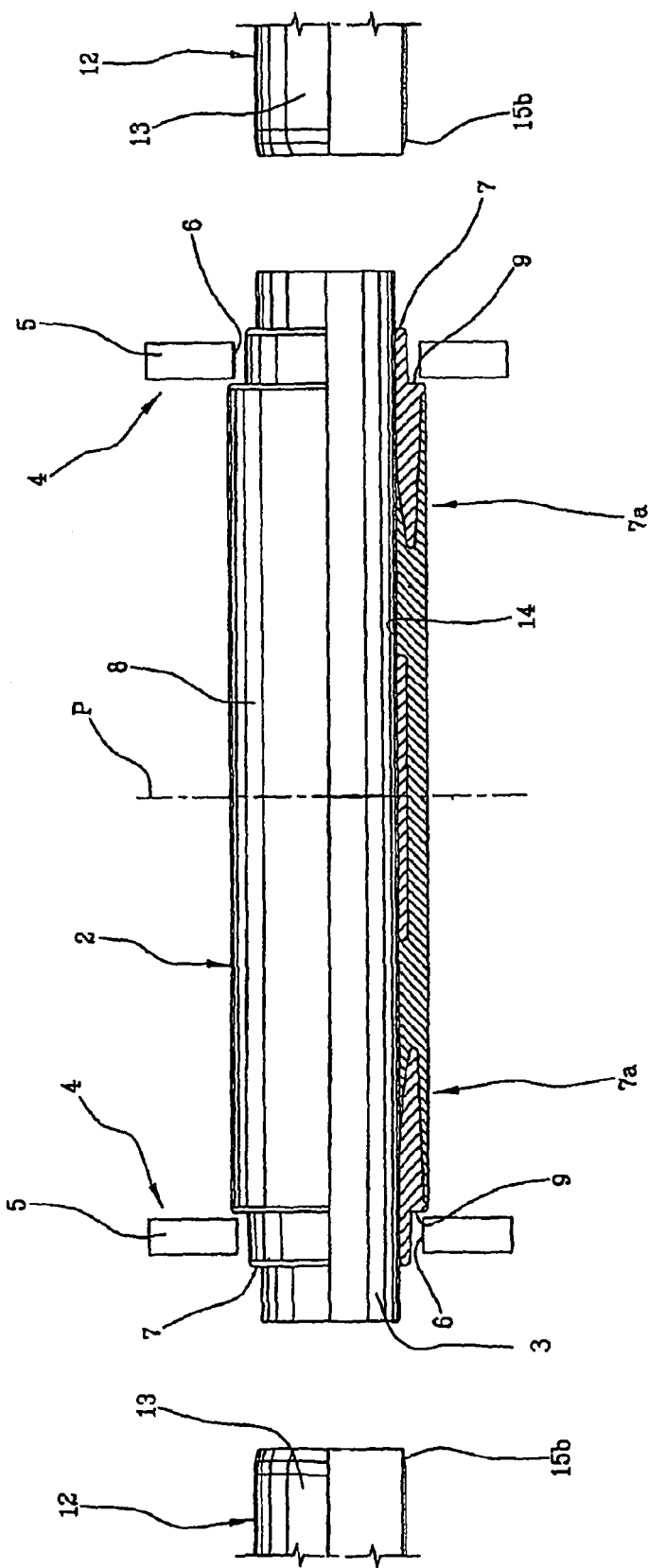

APPARATUSES FOR DISPOSING TUBULAR COVERING SLEEVES FOR ELECTRIC-CABLE JOINTS ON SUPPORTING ELEMENTS

CROSS-REFERENCE TO RELATED APPLICATION(S)

This application is a divisional application of U.S. patent application Ser. No. 12/087,123, entitled "METHOD OF DISPOSING A TUBULAR SLEEVE ON A SUPPORTING ELEMENT AND APPARATUS TO PUT SAID METHOD INTO PRACTICE" and filed on Jun. 26, 2008, now U.S. Pat. No. 8,273,200, and claims the associated benefit under 35 U.S.C. §121. Parent U.S. patent application Ser. No. 12/087,123 was a national stage entry from International Application No. PCT/IT2005/000768, filed on Dec. 28, 2005, in the Receiving Office of the Italian Patent and Trademark Office. The entire contents of parent U.S. patent application Ser. No. 12/087,123 and International Application No. PCT/IT2005/000768 are incorporated herein by reference.

FIELD OF THE INVENTION

The present invention relates to a method of disposing a tubular sleeve on a supporting element, as well as to an apparatus for putting said method into practice.

In particular, the present invention pertains to a method and an apparatus for radially expanding a tubular sleeve and disposing it on a supporting element for splicing of at least one pair of electric cables, said sleeve being adapted to restore the electric connection between cable sections for energy transport or distribution.

The electric cables to be submitted to splicing following the method of the present invention can be cables either of the unipolar type (unipolar cables) or of the multipolar type (bipolar or three-pole cables, for example). These electric cables can be used for transmission or distribution of direct current (DC) or alternating current (AC). The expanded sleeves according to the method and apparatus of the invention can be applied to any electric connection between cables being part of an electric network, as well as to any electric connection between a cable and an electric apparatus, a terminal for example.

STATE OR THE ART

Cables for energy transport and distribution, in particular for transport or distribution of medium- and high-voltage energy, generally comprise, starting from a radially innermost position to a radially outermost position of the cable: an electrically conductive conductor (generally of metal material), an inner semiconductive layer, an insulating layer, an outer semiconductive layer, a metal shield—usually made of aluminium, lead or copper—and an outer polymer sheath for protection from the surrounding atmosphere. The assembly consisting of the following constituent elements of the cable in the mentioned sequence: conductor, inner semiconductive layer, insulating layer and outer semiconductive layer, is usually referred to as "cable core".

In order to splice two electric cables, of the single-pole type for example, the ends of the latter are previously treated so as to expose the constituent elements of said cables over a portion of a predetermined length. Subsequently, the two cables are spliced in order to form an electric connection between the conductors of same, by welding or clamping of the conductors for example, and then a separately-produced tubular covering sleeve is positioned at the splicing region (i.e. the region where the conductors have been spliced).

The tubular sleeve generally comprises a plurality of elements adapted to restore the electric and mechanical continuity of the constituent elements of the cables to be submitted to splicing. This tubular covering sleeve can be applied to the splicing region in the form of a shrinkable tubular sleeve, by previously radially expanding the sleeve itself and subsequently causing shrinkage of same by heating (a heat-shrinkable sleeve) or by removing a previously disposed tubular supporting element aiming at keeping the tubular sleeve—made of resilient material—in a radially expanded condition (a cold-shrinkable sleeve).

Positioning of the sleeve on the supporting element is obtained through devices adapted to fit the sleeve on said supporting element. In particular, these devices cause a radial expansion of the sleeve through direct insertion of the supporting element from one end of the sleeve or through use of a suitable expanding element into which the supporting element is subsequently introduced.

Document EP0368236, in the name of the same Applicant, discloses a process and an apparatus for inserting a rigid support into a sleeve for splicing of electric cables. To this aim, the apparatus described in this document comprises an actuator adapted to engage a rigid tubular support and the above mentioned sleeve.

In more detail, the actuator acts on a pulling bar connected to an ogive integral with a front end of the rigid tubular support. This pulling bar transmits a force oriented in an axial direction to the tubular support, so that said support is inserted into the sleeve. The actuator is such operated that the rigid support dragged along by the pulling bar previously introduced through the sleeve, is inserted into the sleeve starting from a first end of the sleeve itself and drawn in the direction of the second end of the latter. The apparatus further comprises a counter-unit set to engage the tubular sleeve in order to fix positioning of same in an axial direction. The counter-unit comprises two shell halves that can be moved close to each other and each having a plurality of homogeneously distributed presser elements to define a holding seat within which the sleeve is housed when the shell halves are close to each other. The presser elements apply a centripetal radial force to the outer surface of the sleeve to make said surface adhere to the presser elements so as to generate counter-forces distributed over the whole sleeve length that are capable of counteracting the thrust action exerted by the tubular support when it is introduced into the sleeve itself.

Document WO 2/07280 discloses a device for disposing a sleeve expandable in a radial direction on an elongated element provided with an outer cross section larger than the maximum inner cross section of the sleeve in a non-expanded configuration. The device comprises a first and a second units both having a section expandable in a radial direction and being insertable into the sleeve. In addition, the first unit is insertable into the second. To enable pre-expansion of the sleeve, the device further comprises a first and a second rigid tubes that are sequentially introduced into the first unit.

Document WO 02/07281 discloses a device for applying at least two radially expandable sleeves onto at least two parallel elongated elements provided with an outer cross section larger than the maximum inner cross section of each of the sleeves in a non expanded configuration. The device comprises at least two expandable tubular sections integral with a common base, each of said sections including an enlarged portion and an expandable portion provided with a plurality of flexible tailpieces. The device is inserted into the sleeve and the elongated element is subsequently inserted into said device.

Document U.S. Pat. No. 6,049,960 discloses a method and a device for causing sliding and positioning of components in the form of a resiliently expandable sleeve in a radial direction, on cylindrical or conical bodies with an outer diameter larger than the inner diameter of said components. The device comprises a collar to which a plurality of elongated and flexible tabs are connected, said tabs being spaced apart the same distance and being disposed in coaxial relationship with the central axis of the collar. The free ends of the tabs are first inserted into the sleeve-shaped component and then the sleeve is mounted together with the device itself over the end of the previously prepared cable, with the tabs disposed between the sleeve-shaped component and the end of the cable constituting the base body.

SUMMARY OF THE INVENTION

The Applicant has perceived the necessity to improve the known processes for installation of tubular sleeves that are used at the splicing region between at least one pair of electric cables.

In particular, the Applicant has sensed the necessity to improve the radial-expansion methodology for the above sleeves as it has found that the known art solutions cause arising of opposite forces of different amount on the (axially opposite) end portions of the sleeve itself.

Actually, the Applicant has become aware of the fact that an asymmetric distribution of the elastic forces acting on distinct portions of the sleeve (a non-symmetric distribution of efforts and deformations relative to a middle plane of the sleeve perpendicular to the longitudinal axis thereof) is due to the fact that the known art solutions involve insertion of the expansion devices starting from one end alone of the sleeve.

In fact, the Applicant could ascertain that introduction of an expansion device starting from a single end of the sleeve causes generation of axial-compression forces in the sleeve portion concerned with entry of the expansion device and of axial pulling forces in the sleeve portion concerned with exit of the expansion device, said exit portion being axially opposite to said entry portion.

The Applicant has verified that an asymmetric distribution of the efforts causes arising of asymmetric deformations (in particular plastic sets) that keep frozen within the sleeve material and therefore can impair a correct operation of the sleeve itself once the latter has been positioned on the splicing region. Due to said asymmetric deformations, the sleeve expanded according to the known art methodologies and apparatus can in fact have different radial sizes along its axial extension, which will result in an asymmetric and uneven tightening action of the sleeve on the splicing region.

The Applicant has also found that, should the sleeve to be submitted to expansion be provided with an outer sheath, the latter being generally coupled with the sleeve by interposition of a lubricating agent utilised to promote laying of the outer sheath on said sleeve, and if the expansion devices are introduced from one end alone of the sleeve itself, the outer sheath can suffer a modification in its axial centring relative to the underlying sleeve. In other words, the Applicant has found that, should the expansion devices be inserted from a single sleeve end, in order to avoid axial displacement of the outer sheath relative to the sleeve it is necessary to position the sheath on the sleeve at a position that is out-of-centre by an amount equal to the axial sliding to which the sheath is submitted during introduction of the expansion devices into the sleeve, so that the result, when expansion has been completed, be a correct centring of the outer sheath on the underlying sleeve.

The Applicant therefore has become aware of the necessity to obtain tubular sleeves radially expanded in a symmetric manner relative to a middle plane perpendicular to the longitudinal axis of the sleeves themselves, so that possible permanent sets generated on the sleeve following introduction of the expansion devices be symmetrically distributed along the longitudinal extension of the sleeve and, as a result, an even tightening action of the sleeve on the splicing region be ensured, as well as centring of the outer sheath on the sleeve, should the latter be already provided with said sheath.

The Applicant has found that the method of radially expanding a tubular sleeve is advantageously greatly improved if the expansion is carried out in a gradual and symmetric manner starting from both axially opposite ends of the sleeve to be submitted to expansion. The Applicant in fact has verified that in this way the axially opposite portions of the sleeve are submitted to the same distribution of efforts.

Therefore, in a first aspect, the present invention relates to a method of disposing a tubular covering sleeve for electric-cable joints on a supporting element, said method comprising the steps of: arranging a tubular sleeve; causing radial expansion of said tubular sleeve starting from axially opposite end portions of said tubular sleeve; arranging said tubular sleeve in a radially-expanded condition on a supporting element.

Preferably, radial expansion of the tubular sleeve is carried out gradually starting from the end portions of said sleeve towards an axially intermediate portion thereof.

More preferably, radial expansion of the tubular sleeve is carried out simultaneously on both the end portions of the tubular sleeve. Preferably, radial expansion of the tubular sleeve is radially symmetric.

In a further aspect, the present invention relates to an apparatus for disposing a tubular covering sleeve for electric-cable joints on a supporting element, said apparatus comprising: a support for a tubular sleeve; a pair of expanders to be placed to a substantially coaxial position relative to said tubular sleeve, each at a respective end of the sleeve; driving means adapted to introduce the expanders into the respective ends of the sleeve and to cause radial expansion of the sleeve itself; devices for disposing the sleeve in a radially expanded condition on said supporting element.

Further features and advantages will become more apparent from the detailed description of some preferred, but not exclusive embodiments of a method of disposing a tubular covering sleeve for electric-cable joints on a supporting element, as well as of an apparatus for disposing a tubular covering sleeve for electric-cable joints on a supporting element, in accordance with the present invention.

BRIEF DESCRIPTION OF THE DRAWINGS

This description will be set out hereinafter with reference to the accompanying drawings, given by way of non-limiting example, in which:

FIG. 3 shows the apparatus in FIG. 1 in a second operating configuration;

FIG. 3a shows a detail to an enlarged scale of the apparatus in FIG. 3;

FIG. 5 is a partial longitudinal section of the sleeve during the first step of radial expansion shown in FIG. 4;

FIGS. 6 to 8 show respective subsequent steps of radial expansion of the sleeve;

FIG. 11 shows the sleeve installed on the supporting element.

DETAILED DESCRIPTION OF THE PREFERRED EMBODIMENTS

Figure 1:
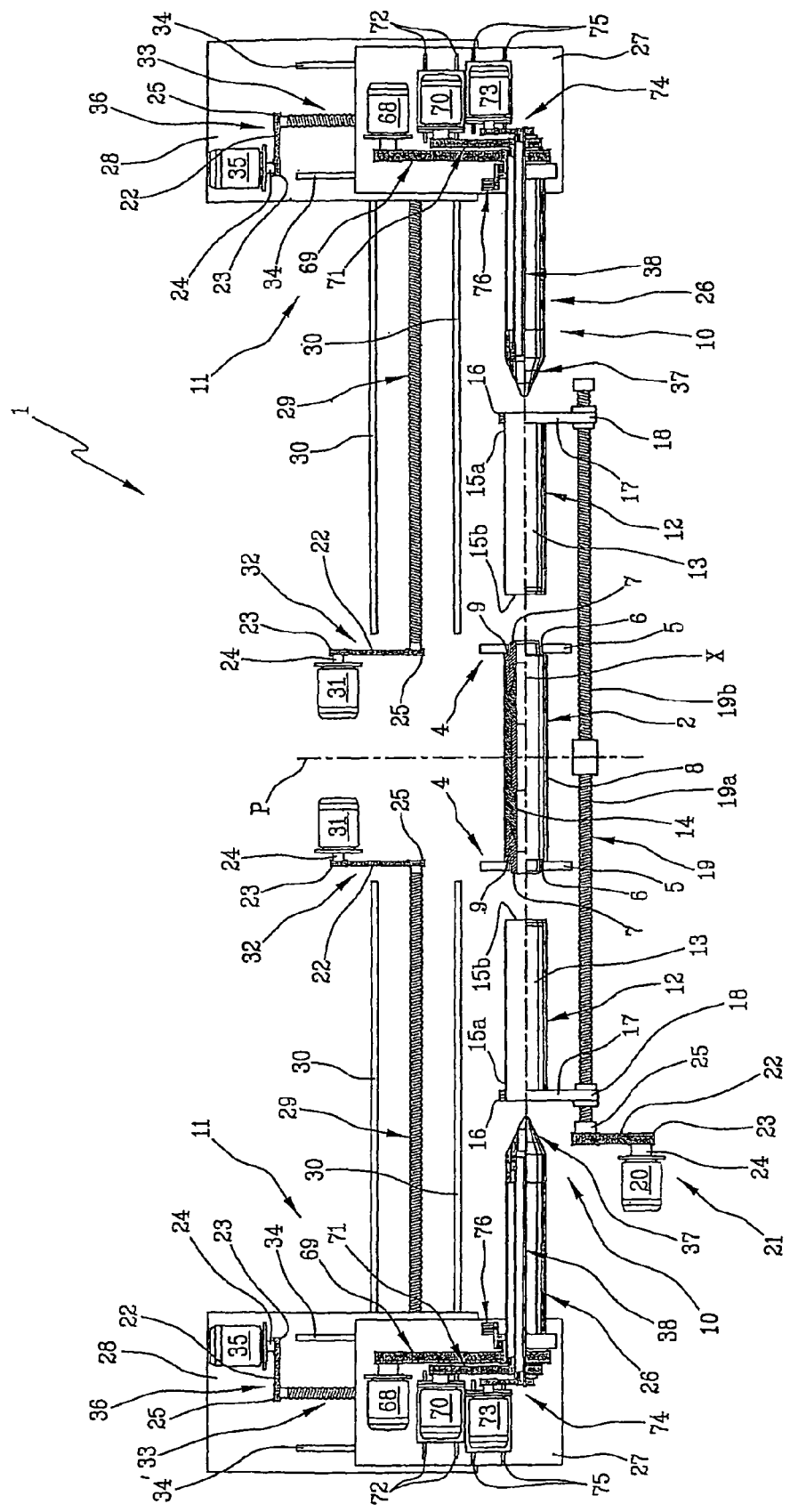
FIG. 1 is a partly sectioned side view of an apparatus for arranging a tubular covering sleeve for electric-cable joints on a supporting element in accordance with the present invention, in a first operating configuration.

With reference to the drawings, an apparatus for disposing a tubular covering sleeve 2 for electric-cable joints on a supporting element 3 in accordance with the present invention has been generally identified by reference numeral 1.

Apparatus 1 comprises a support 4 capable of supporting and locking the sleeve 2 during a step of radial expansion of the latter. In the embodiment shown in the accompanying drawings, this support 4 has a pair of plates 5 parallel to each other and mutually spaced apart by substantially the same distance as the length of sleeve 2. Each plate is provided with a shaped opening 6 adapted to receive one end 7 of said sleeve 2. To this aim, each of the ends 7 of sleeve 2 has an outer diameter smaller than the outer diameter of an axially intermediate portion 8 thereof, so as to form a shoulder 9 adapted to abut against the edges of a respective opening 6. Preferably, opening 6 of the plates conforms in shape to the respective end 7 of the sleeve and can modify its radial size so as to become wide during expansion of the ends 7 of sleeve 2 and follow deformation of the latter.

Apparatus 1 further comprises a pair of expanders 10 each moved by driving means 11 capable of disposing the expanders to a position substantially coaxial with the sleeve 2 put on the support 4 and close to a respective end 7 of the sleeve 2 itself. The driving means 11 further carries out introduction of the expanders 10 into the respective ends 7 of sleeve 2, so as to cause radial expansion of the latter. The expanders 10 are preferably introduced as far as their distal ends 10a abut against each other at the axially intermediate portion 8 of sleeve 2.

Preferably but not exclusively, the two expanders 10 are of the telescopic type and have the same structure. Advantageously, the expanders 10 are preferably introduced into sleeve 2 by a synchronised and symmetric movement relative to a symmetry plane "P" transverse to a longitudinal axis "X" of the sleeve 2 and passing through the axially intermediate portion 8 of the latter, so as to cause a radial expansion which too is symmetric relative to said plane "P".

In the preferred embodiment herein shown, each of the expanders 10 comprises a radially external tubular body 12 of circular section and provided with a side surface 13 susceptible of engagement with an inner wall 14 of sleeve 2. A proximal end 15a of the radially external tubular body 12 is provided with a flange 16 having a tailpiece 17 extending radially away from body 12 and carrying a lead nut 18 installed on a first worm screw 19. Distal ends 15b of the radially external tubular bodies 12 face each other and are provided with a bevelled edge in the form of a truncated cone, better seen in FIGS. 5-8, to promote introduction into sleeve 2.

The first worm screw 19 extends parallel to the longitudinal axis "X" of sleeve 2 and has two portions 19a, 19b with contrary threads, each supporting one of the lead nuts 18 connected to a respective radially external tubular body 12. Said two portions 19a, 19b extend symmetrically starting from the symmetry plane "P" and are supported by a suitable fixed frame, not shown.

The driving means 11 comprises a first main motor 20, an electric motor for example, operatively in engagement with the first worm screw 19, through either a belt drive 21 for example, or a chain or gear drive. In the non-limiting example shown, a belt 22 is wrapped on a driving pulley 23 integral with the shaft 24 of the first main motor 20 and on a driven pulley 25 integral with the first worm screw 19. Rotation of the first worm screw 19 in a first direction causes translation of the two radially external tubular bodies 12 close to each other, towards the symmetry plane "P", while rotation in the opposite direction causes mutual spacing apart of same.

Each expander 10 further comprises a radially internal body 26 movable between a disengaged position (FIGS. 1 and 10) at which it lies spaced apart from the respective radially external tubular body 12, preferably at a position axially offset relative to said radially external body 12, and an engaged position (FIG. 3), at which it is inserted in the respective radially external tubular body 12. The first main motor 20 connected to the radially external tubular bodies 12 is adapted to simultaneously introduce the expanders 10 into sleeve 2 while the radially internal body 26 is in the engaged position.

To this aim, each radially internal body 26 is mounted on a respective main support assembly 27 which in turn is installed on an auxiliary support assembly 28. Both the mentioned assemblies 27, 28 are diagrammatically shown in the figures as rectangular tables. Each of the main support assemblies 27 and each of the auxiliary support assemblies 28 is moved along a direction parallel to the longitudinal axis "X" of sleeve 2 by a respective second worm screw 29 extending parallel to said longitudinal axis "X" and is supported by a suitable fixed frame, not shown. The second worm screw 29 bears a lead nut, not shown, connected to the respective main support assembly 27 through the auxiliary support assembly 28. In more detail, the mentioned lead nut is integral with the auxiliary support assembly 28 and in the accompanying drawings is not shown as it is concealed behind it. A second main motor 31 being part of the driving means 11, is operatively engaged with the second worm screw 29 to move the respective radially internal body 26 together with the main 27 and auxiliary 28 support assemblies on parallel guides 30 extending along a direction parallel to the longitudinal axis "X". The second main motor 31 also of the electric type for example, is connected to said second worm screw 29 through either a belt drive 32 for example, or a chain or gear drive. Preferably, as shown, a belt 22 is wrapped on a driving pulley 23 integral with the shaft 24 of the second main motor 31 and on a driven pulley 25 integral with the second worm screw 29. Rotation of the second screw 29 in a first direction causes translation of the respective radially internal tubular body 26 close to the symmetry plane "P", while rotation in the opposite direction causes moving apart of same. Preferably, the second main motors 31 are operated by a single control unit, not shown, for simultaneous and symmetric movement of the radially internal tubular bodies 26.

Further mounted on the auxiliary support assembly 28 is a third worm screw 33 extending along a direction transverse to the longitudinal axis "X" of sleeve 2 and to the second worm screw 29 and supporting a concealed lead nut integral with the respective main support assembly 27. The auxiliary support assembly 28 therefore is maintained to an interposed position between the second worm screw 29 and the respective main support assembly 27, A third main motor 35 is located over the auxiliary support assembly 28 and is connected to the respective third worm screw 33, to move the main support assembly 27 along mutually parallel guides 34 transverse to the longitudinal axis "X" of sleeve 2 and positioned on the auxiliary support assembly 28. In a manner quite similar to the first 20 and second 31 main motors, the third main motor 35 is connected to the third worm screw 33 by means either of a belt drive 36 for example, or of a chain or gear drive. Preferably, as shown, a belt 22 passes over a driving pulley 23 integral with the shaft 24 of the third main motor 35 and over a driven pulley 25 integral with the third worm screw 33. Rotation of the third screw 33 in a first direction causes translation of the main support assembly 27 and the respective radially internal tubular body 26 close to the longitudinal axis "X" of sleeve 2, while rotation in the opposite direction causes moving apart of same.

Figure 2:
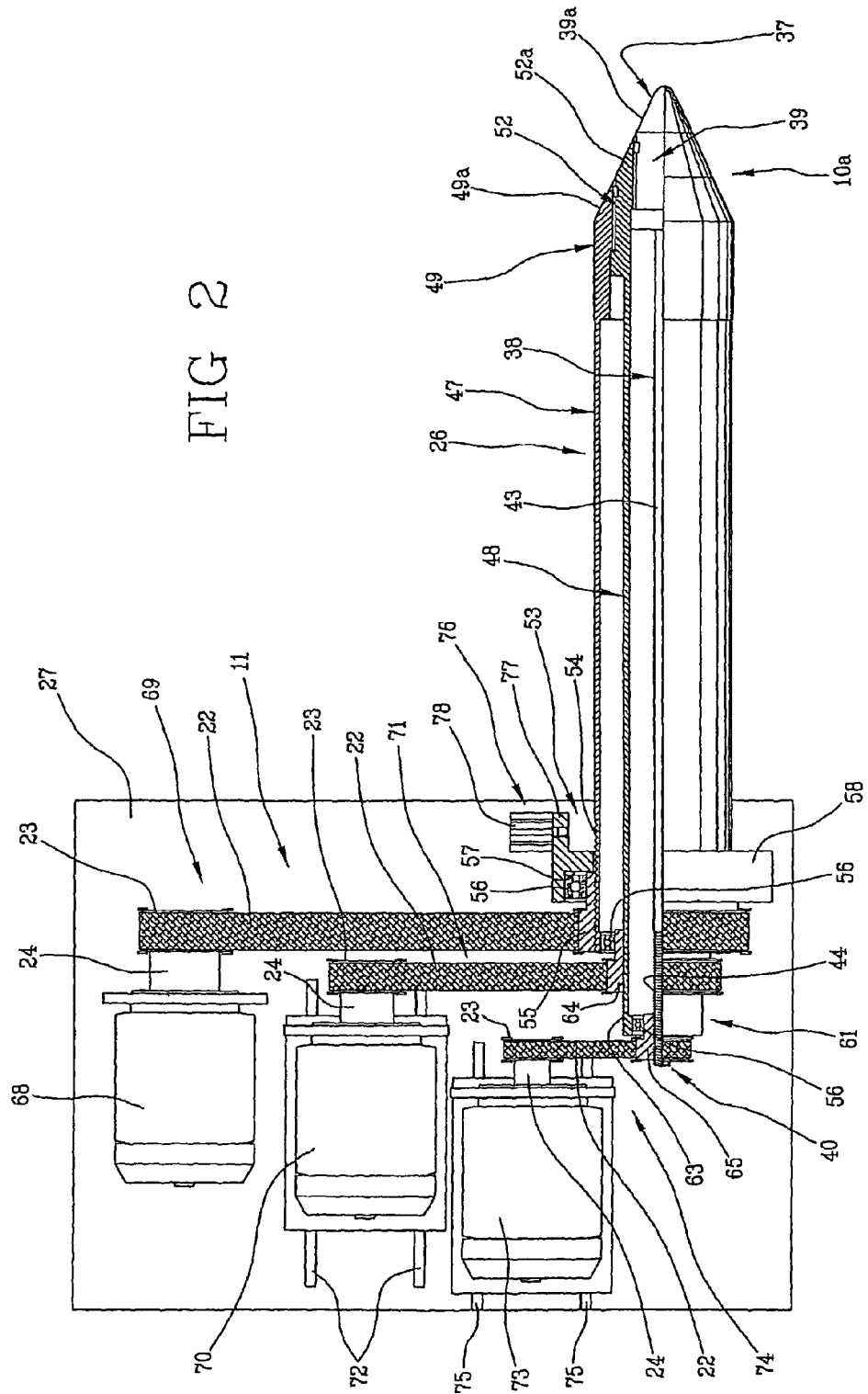
FIG. 2 shows an enlarged portion of the apparatus in FIG. 1 in the first operating configuration.

The radially internal body 26, in a first operating configuration shown in FIG. 2, has a tapered distal end 37, in the form of an ogive for example, to facilitate introduction of the body itself into sleeve 2 and cause gradual expansion of ends 7.

Figure 2A:
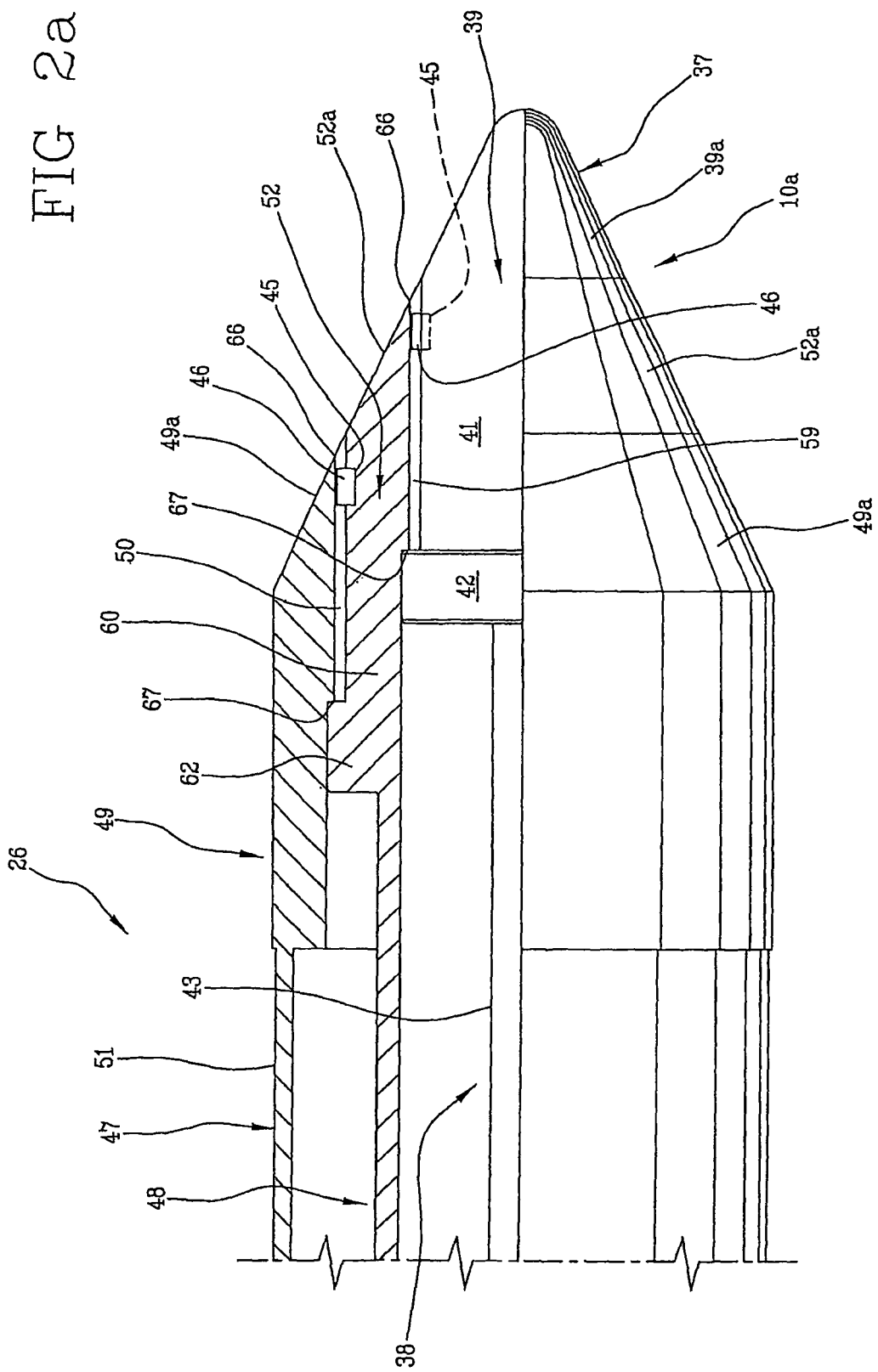
FIG. 2a shows a detail to an enlarged scale of the portion in FIG. 2.
Figure 10:
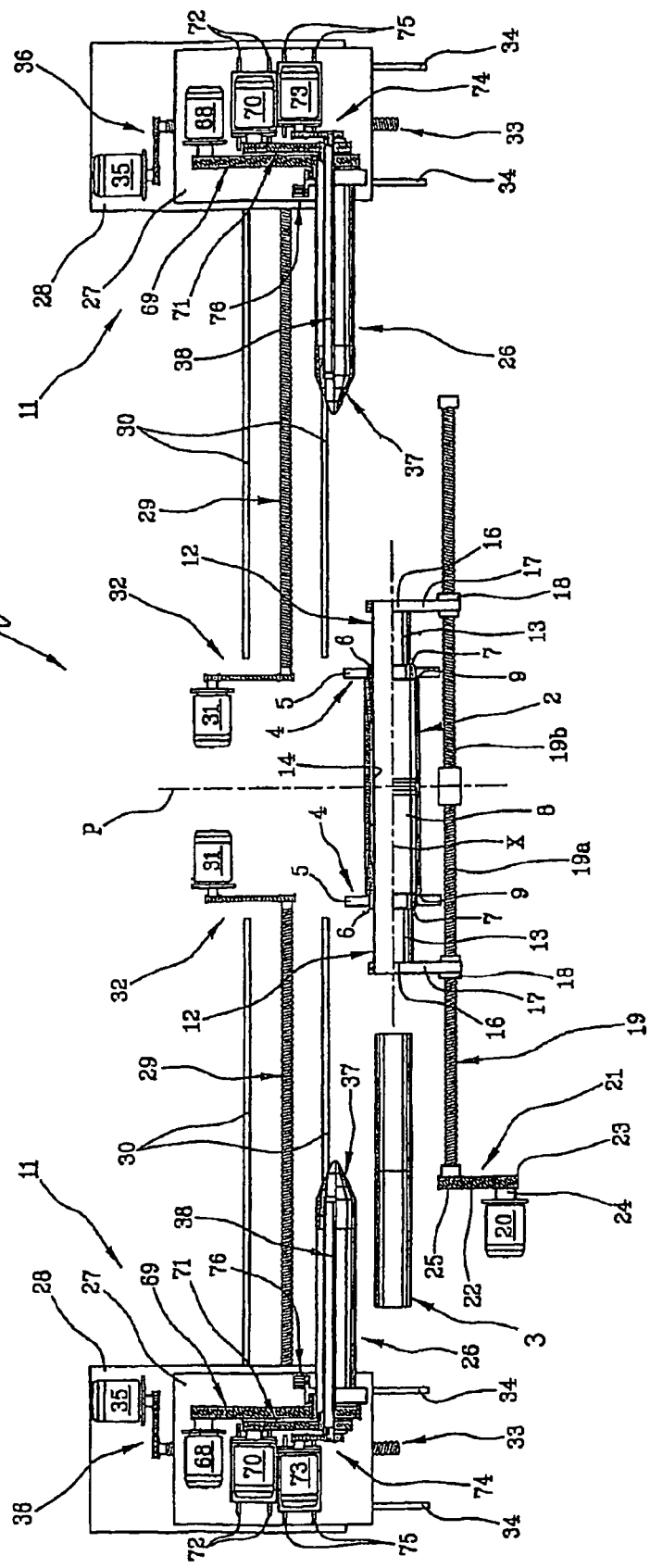
FIG. 10 shows the apparatus seen in FIG. 1 in a further operating configuration.

In more detail (FIGS. 2 and 2a) in the preferred embodiment herein shown, each of the radially internal bodies 26 comprises a central element 38 which has a distal portion 39 provided with a tapered distal end 39a in the form of an ogive for example, that in the first operating configuration in FIGS. 2, 2a and 10, constitutes the point of the ogive 37 of the radially internal body 26 considered as a whole. The distal portion 39 carrying the ogive comprises a cylindrical length 41 having an annular ridge 42 at the rear, i.e. towards the proximal end 40 of the central element 38. The central element 38 further has an intermediate length 43 interposed between the proximal end 40 and the annular ridge 42, which intermediate length 43 is rod-shaped and terminates with an outer thread 44 placed on said proximal end 40. The cylindrical length 41 is further provided with radial seats 45 for housing keys 46 set to prevent mutual rotation between the different elements of the radially internal body 26, as better detailed in the following of the present specification.

The radially internal body 26 further comprises an outer tubular element 47 disposed around the central element 38 and slidably in engagement with said central element 38. Preferably, an intermediate tubular element is located between the central element 38 and the outer tubular element 47 and is slidably in engagement with both of them. While in the embodiment shown only one intermediate element 48 is represented, also adoption of a plurality of intermediate elements 48 coaxial with each other falls within the scope of the present invention, so as to define a multi-stage telescopic radially internal body 26. Preferably, said stages are four in number.

Figure 9:
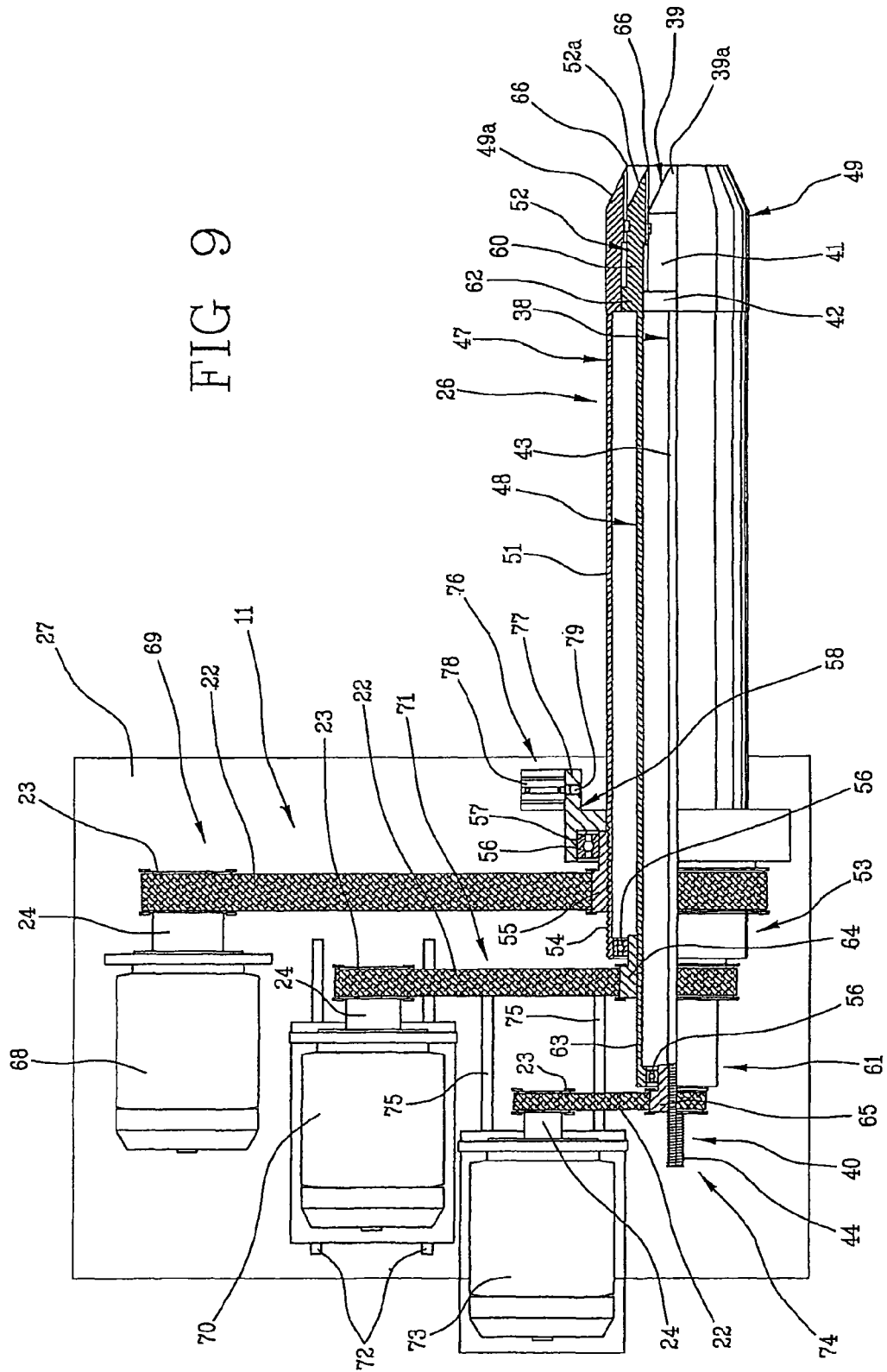
FIG. 9 shows the enlarged portion seen in FIG. 2 in the configuration taken in the operating steps of FIGS. 7 and 8.

The outer tubular element 47 has a distal portion 49 provided with a tapered distal end 49a, preferably of frustoconical shape. In detail, the distal portion 49 internally has axial splines 50 adapted to slidably house the keys 46 inserted in the radial seats 45 formed in the intermediate tubular element 48, to prevent mutual rotation of said intermediate tubular element 48 relative to the outer tubular element 47. The wall of the distal portion 49 of the outer tubular element 47 has an increased thickness than an intermediate length 51 of said outer tubular element 47 and delimits a passageway adapted to receive and guide a distal portion 52 of the intermediate tubular element 48. A proximal end 53 of the outer tubular element 47 has an outer thread 54 on which a lead nut 55 is installed, said lead nut 55 being rotatably mounted, by means of bearings 56 for example, in a seat 57 formed in a housing body 58 set up in an integral manner on the main support assembly 27 (FIGS. 2, 3a and 9). The lead nut 55 mounted on the outer tubular element 47 is axially locked relative to said housing body 58.

Also the distal portion 52 of the intermediate tubular element 48 has a distal end 52a provided with a bevel adapted to give it a frustoconical tapered shape and is internally provided with axial splines 59 into which the keys 46 housed in the radial seats 45 of the cylindrical length 41 of the central element 38 are slidably engaged, to prevent mutual rotation between said intermediate tubular element 48 and the central element 38. The distal portion 52 further comprises a cylindrical length 60 having an annular ridge 62 at the rear, i.e. towards a proximal end 61 of the intermediate tubular element 48, which annular ridge 62 is similar to the annular ridge 42 of the central element 38.

The proximal end 61 of the intermediate tubular element 48 has an outer thread 63 on which a lead nut 64 is mounted which is rotatably engaged, by means of bearings 56 for example, into the proximal end 53 of the outer tubular element 47. The lead nut 64 mounted on the intermediate tubular element 48 is axially locked relative to said outer tubular element 47 and is movable therewith.

Finally, a further lead nut 65 is mounted on the thread 44 of the central element 38, is rotatably engaged by means of bearings 56 for example, into the proximal end of the intermediate tubular element 48, and is axially locked relative to said intermediate tubular element 48 and movable therewith.

In the instance not shown in which several intermediate tubular elements are present, the structure of each of them is substantially identical with that described for the intermediate tubular element 48 depicted in the figures.

In a further alternative embodiment not shown, the intermediate tubular element 48 is absent and the lead nut 65 of the central element 38 is directly mounted to the proximal end 53 of the outer tubular element 47.

The central element 38, intermediate tubular element 48 and outer tubular element 47 are mutually movable between said first operating configuration, at which the ogive-shaped end 39a and the tapered distal ends 49a, 52a form a continuous tapered and preferably substantially conical surface shown in FIGS. 2 and 2a, and a second operating configuration at which the point of the ogive-shaped end 39a and the edges 66 of the tapered distal ends 49a, 52a lie in the same plane (FIG. 9). In the first operating configuration in FIG. 2a, the shoulders defined by the annular ridges 42, 62 of the central element 38 and the intermediate tubular element 48 lie against shoulders 67 located on inner surfaces of the intermediate tubular element 48 and the outer tubular element 47, respectively.

The driving means 11 further comprises a pair of auxiliary motors 68 each of which is fixedly mounted on the main support assembly 27 and is connected to the respective outer tubular element 47 by means of a belt drive 69 for example, or of a chain or gear drive. In the embodiment shown a belt 22 is wrapped on a driving pulley 23 fitted on shaft 24 of the first auxiliary motor 68 and on the lead nut 55 of the outer tubular element 47. Rotation of the lead nut 55 caused by the first auxiliary motor 68 through belt 22 causes translation of the outer tubular element 47 relative to the main support assembly 27 on which it is installed.

A second pair of auxiliary motors 70 moves the intermediate tubular elements 48. In particular, each of the second auxiliary motors 70 is installed on the main support assembly 27 and connected to the respective intermediate tubular element 48 by means of either a belt drive 71, or a chain or gear drive. In the embodiment shown, a belt 22 is wrapped on a driving pulley 23 fitted on the shaft 24 of the second auxiliary motor 70 and on the lead nut 64 of the intermediate tubular element 48. Rotation of the lead nut 64 caused by the second auxiliary motor 70 through belt 22 causes translation of the intermediate tubular element 48 relative to the outer tubular element 47. The second auxiliary motor 70 is moved on guides 72 substantially parallel to the longitudinal axis "X" of sleeve 2 and placed on the first main support assembly 27, to follow the axial movement of the outer tubular element 47. Axial-motion transmission from the outer tubular element 47 to the second auxiliary motor 70 preferably takes place through a rigid connection, not shown.

A third pair of auxiliary motors 73 moves the central elements 38. In particular, each of the third auxiliary motors 73 is installed on the main support assembly 27 and is connected to the respective central element 38 by means either of a belt drive 74 for example, or of a chain or gear drive.

As for the first 68 and second 70 auxiliary motors, a belt 22 is wrapped on a driving pulley 23 fitted on the main shaft 24 of the third auxiliary motor 73 and on the lead nut 65 of the central element 38. Rotation of the lead nut 65 caused by the third auxiliary motor 73 through belt 22 causes translation of the central element 38 relative to the intermediate tubular element 48. The third auxiliary motor 73 is moved on guides 75 that are substantially parallel to the longitudinal axis "X" of sleeve 2 and placed on the first main support assembly 27, to follow axial motion of the intermediate tubular element 48. Axial-motion transmission from the intermediate tubular element 48 to the third auxiliary motor 73 preferably takes place by a rigid connection, not shown.

Each of the main support assemblies 27 comprises a locking device 76 capable of making the radially external tubular body 12 of the expander 10 and the main support assembly 27 integral with each other.

In detail, the locking device 76 is defined by a tailpiece 77 of the housing body 58 on which a hydraulic or pneumatic cylinder 78 is mounted (FIG. 3a). The rod 79 of the cylinder 78 is slidable in a hole 80 formed in the tailpiece 77 along a radial direction.

The radially external tubular body 12 has a housing 81 located on the proximal end 15a and formed in the flange 16, for example. Housing 81 is capable of receiving the rod 79 when the radially internal body 26 is in the above mentioned engaged position, at which it is inserted in the respective radially external tubular body 12. The rod 79 is therefore movable between a backward position, at which it is completely contained in hole 80 and an extracted position at which it projects from said hole 80 to enter housing 81.

In use, the sleeve 2 in a rest configuration, i.e. not yet expanded, is positioned on the support 4 and has its ends 7 placed in the openings 6. As shown in FIG. 1, the radially external tubular bodies 12 of the expanders 10 are in alignment with the longitudinal axis "X", their distal ends 15b facing the ends 7 of sleeve 2. In addition, the radially internal bodies 26 too lie in alignment with the longitudinal axis "X", their distal ends 37 facing the proximal ends 15a of the radially external tubular bodies 12. Each of the radially internal tubular bodies 26 is in the first operating configuration, better shown in FIGS. 2 and 2a, in which the ogive-shaped end 39a and the tapered distal ends 49a, 52a form a continuous and substantially conical surface.

Subsequently, by operating the second main motors 31, the radially internal bodies 26, together with the respective main 27 and auxiliary 28 support assemblies, are moved forward along the respective second worm screws 29, until each radially internal body 26 is completely inserted into the corresponding radially external tubular body 12, and housing 81 is disposed close to hole 80 of the tailpiece 77 (FIGS. 3 and 3a). The rod 79 of the cylinder 78 is inserted in hole 80 to lock each radially external tubular body 12 on the respective main support assembly 27.

Figure 4:
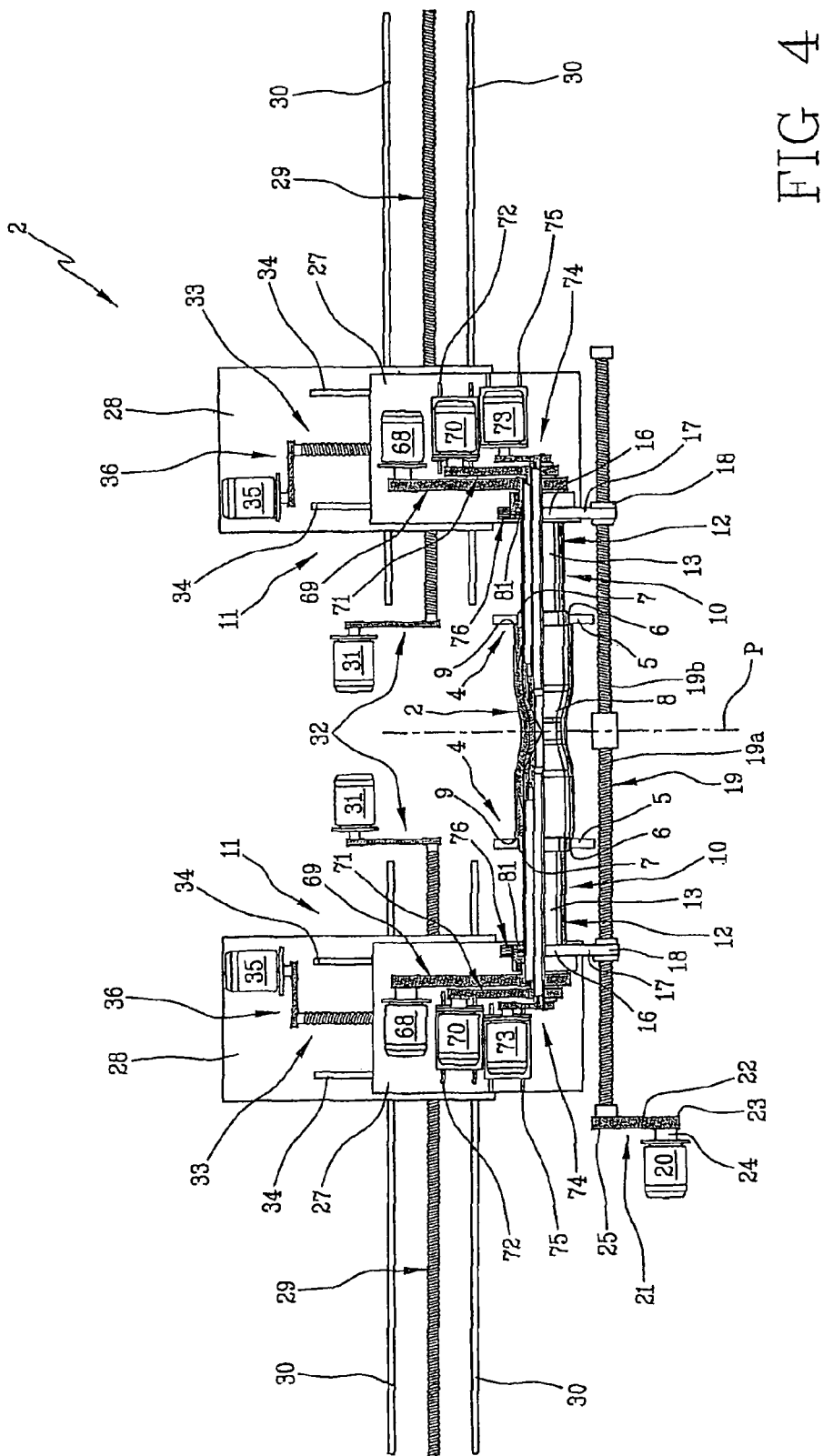
FIG. 4 shows the apparatus seen in FIG. 1 in a third operating configuration corresponding to a first step of radial expansion of the sleeve.

At this point, the first main motor 20 drives in rotation the first worm screw 19 that, through the lead nuts 18 connected therewith, drags along the two expanders 10, each integral with its main 27 and auxiliary 28 support assemblies, and moves them close to the symmetry plane "P". During this step, the auxiliary assemblies 28 are preferably disconnected from the second worm screw 29 and move on their guides being dragged along by the first worm screw 19 alone. During moving forward towards said symmetry plane "P", the distal ends 10a of the expanders 10, formed by the distal ends 15b, 37 of the radially external tubular body 12 and the radially internal body 26, enter the ends 7 of sleeve 2 causing radial expansion of said ends until the distal ends 10a, i.e. the ogive points, abut against each other at the symmetry plane "P (FIGS. 4 and 5). Under this condition, visible in FIG. 5, the end portions 7a of sleeve 2 are already expanded while the axially intermediate portion 8 is only partly expanded.

To complete expansion, the first 68, second 70 and third 73 auxiliary motors move the tubular elements 47, 48 and the central element 38 in a direction opposite to the moving forward direction of the respective radially external tubular body 12, so as to first bring the distal ends 39a of the central elements 38 into mutual contact, then the distal ends 49a, 52a of the tubular elements 47, 48 and finally the distal ends 15b of the radially external tubular bodies 12.

In more detail, after the ogive points 10a have come into mutual contact (FIG. 5), the main 27 and auxiliary 28 assemblies, upon the action of the first main motors 20, go on moving forward towards the symmetry plane "P" taking along with them the radially external tubular body 12, outer tubular element 47 and intermediate tubular element 48 that are integral with each other.

The third auxiliary motor 73 of each of the two expanders 10 acts on the central element 38 making it move backwards relative to the intermediate tubular element 48, so as to maintain its distal end 39a fixed on the symmetry plane "P". The radially external tubular body 12, outer tubular element 47 and intermediate tubular element 48 start gradual expansion also of the axially intermediate portion 8 of sleeve 2.

When the distal ends 52a of the intermediate tubular element 48 come into mutual contact (FIG. 6), intervention of the second auxiliary motor 70 working together with the third auxiliary motor 73 occurs to cause joint backwards movement of the central element 38 and the intermediate tubular element 48 relative to the outer tubular element 47, so as to also keep the distal ends 52a of the intermediate tubular element 48 fixed on the symmetry plane "P", while the outer tubular elements 47 together with the radially external tubular bodies 12 go on moving forward.

Figure 8:
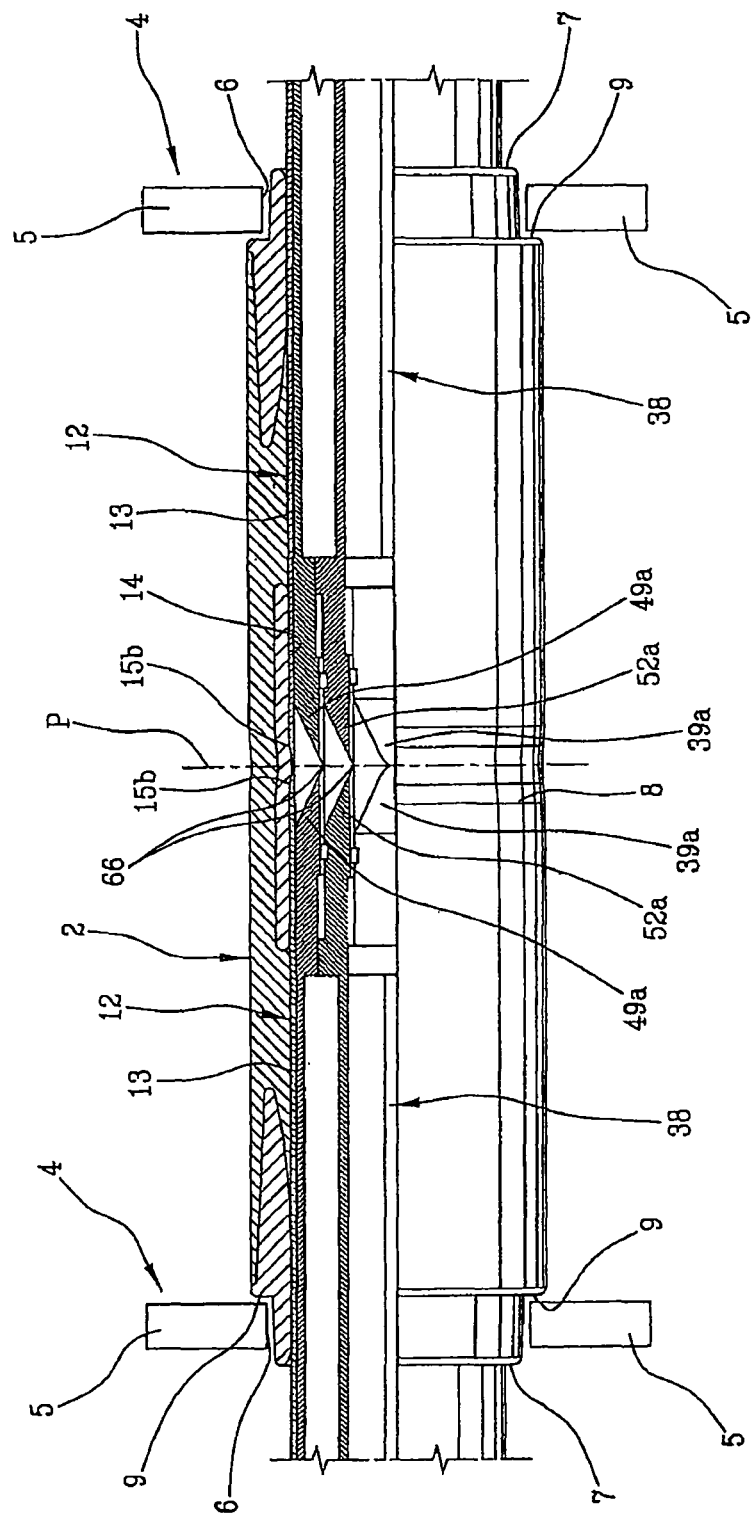

When the distal ends 49a too of the outer tubular element 47 come into mutual contact (FIG. 7), intervention of the first auxiliary motor 68 working together with the second 70 and third 73 auxiliary motors occurs, to cause joint moving backwards of the central element 38, the intermediate tubular element 48 and the outer tubular element 47 relative to the radially external tubular body 12. Said radially external tubular bodies 12 go on moving forward upon the action of the first main motor 20, until bringing their distal ends 15b into mutual contacts and completing radial expansion of sleeve 2 (FIG. 8).

Where a plurality of intermediate tubular elements 48 is present, the radially internal body 26 is formed with a plurality of telescopic tubular elements disposed around the central element 38. These telescopic tubular elements are moved forward in succession from the innermost one to the outermost one until abutment of the respective tapered distal ends, one after the other.

In order to obtain full expansion of sleeve 2, abutment of the two radially external bodies 12 is sufficient. Therefore, according to a variant of the present invention, only the radially external bodies 12 abut against each other without bringing the radially internal bodies 26 into mutual contact.

When expansion has been completed, the radially internal bodies 26 of the expanders 10 are unlatched and pulled out of the radially external tubular bodies 12. To this aim, the auxiliary assemblies 28 are connected with the respective second worm screws 29 and axially moved apart from sleeve 2 through the action of the second main motors 31. In addition, the radially internal bodies 26, once separated and axially spaced apart, are radially shifted relative to the longitudinal axis "X" of the sleeve 2 itself, moving the main support assemblies 27 along the respective guides 34 upon the action of the third main motors 35 and third worm screws 33 (FIG. 10).

Devices not shown carry out insertion of the supporting element 3 into the radially external tubular bodies 12 still disposed in the sleeve 2. Finally, said radially external tubular bodies 12 radially interposed between the sleeve 2 and supporting element 3 are simultaneously drawn out upon operation of the first motor 20, to enable shrinkage of the sleeve 2 on the supporting element 3 (FIG. 11).

A method of disposing the tubular covering sleeve 2 for electric-cable joints on the supporting element 3 comprises the steps of causing radial expansion of the tubular sleeve 2 starting from the axially opposite end portions 7a of the sleeve 2 itself and disposing the tubular sleeve 2 in a radially expanded condition on the supporting element 3.

Irrespective of the apparatus used, in accordance with the present invention, this radial expansion is preferably carried out gradually starting from the end portions 7a to the axially intermediate portion 8 of the tubular sleeve 2 and simultaneously on both of the end portions 7a, so that said radial expansion is radially symmetric relative to the above described symmetry plane "P". After the radial expansion step, sleeve 2 preferably has an inner diameter larger than the outer diameter of the supporting element 3 on which it is to be disposed and laying is produced by causing a radial shrinkage of sleeve 2 on the supporting element 3 itself.

The supporting element 3 is preferably an independent tubular support, as specified above in describing operation of apparatus 1.

Alternatively, the supporting element consists of the ends themselves of the cables to be spliced, the above described operations being conducted directly in the trench.

Alternatively, the supporting element is made up of the two radially external tubular bodies 12. In this case, the two radially external tubular bodies 12 are disconnected from the flanges 16 integral with the lead nuts 18 mounted on the first worm screw 19 and need replacement by further bodies 12 expansion of a subsequent sleeve 2 is to be carried out.

The above described movements are preferably and advantageously controlled and governed by an electronic programmable control unit connected to all or part of motors 20, 31, 35, 68, 70, 73 and possibly to sensors, not shown, adapted to detect the positions, displacements and velocities of the different parts of the apparatus, for example.

The invention claimed is:

1. An apparatus for disposing a tubular covering sleeve for electric-cable joints on a supporting element, the apparatus comprising:
   a support for the tubular covering sleeve;
   a pair of expanders;
   drivers configured to introduce the expanders into respective ends of the tubular covering sleeve and to cause radial expansion of the tubular covering sleeve; and
   devices configured to dispose the tubular covering sleeve in a radially expanded condition on the supporting element;
   wherein the expanders are configured to be placed in substantially coaxial positions relative to the tubular covering sleeve at the respective ends of the tubular covering sleeve.

2. The apparatus of claim 1, wherein the expanders are structurally identical.

3. The apparatus of claim 1, wherein the expanders comprise inner and outer members provided in a telescopic arrangement.

4. The apparatus of claim 1, wherein each of the expanders comprises:
   a radially external tubular body configured to be brought into engagement with an inner wall of the tubular covering sleeve; and
   a radially internal body that is axially movable relative to the radially external tubular body.

5. The apparatus of claim 4, wherein the radially internal body has an ogive-shaped distal end.

6. The apparatus of claim 4, wherein the radially internal body is movable between a disengaged position, at which the radially internal body lies spaced apart from a respective radially external tubular body, and an engaged position, at which the radially internal body is inserted in the respective radially external tubular body.

7. The apparatus of claim 6, wherein at the disengaged position, the radially internal body is axially offset from the respective radially external tubular body.

8. The apparatus of claim 6, wherein the drivers comprise:
   a first main motor connected to the radially external tubular bodies;
   wherein the first main motor is configured to simultaneously introduce the expanders into the tubular covering sleeve while the radially internal body is at the engaged position.

9. The apparatus of claim 8, wherein the first main motor is operatively engaged with a first worm screw parallel to a longitudinal axis of the tubular covering sleeve,
   wherein the first worm screw comprises two portions with contrary threads, and
   wherein each portion of the first worm screw supports a lead nut connected to a respective radially external tubular body.

10. The apparatus of claim 9, wherein a belt drive connects the first main motor to the first worm screw.

11. The apparatus of claim 8, wherein the drivers further comprise:
   a second main motor for each radially internal body;
   wherein each second main motor is configured to move the respective radially internal body along a direction parallel to a longitudinal axis of the tubular covering sleeve.

12. The apparatus of claim 11, wherein each second main motor is operatively engaged with a respective second worm screw parallel to the longitudinal axis of the tubular covering sleeve, and wherein each second worm screw supports a lead nut connected to a respective main support assembly of the respective radially internal body.

13. The apparatus of claim 12, wherein a belt drive connects each second main motor to the respective second worm screw.

14. The apparatus of claim 12, further comprising:
an auxiliary support assembly interposed between the respective second worm screw and the respective main support assembly;
wherein the auxiliary support assembly supports a third main motor connected to the respective main support assembly, and
wherein the third main motor is configured to move the respective main support assembly along a direction transverse to the longitudinal axis of the tubular covering sleeve.

15. The apparatus of claim 14, wherein each third main motor is operatively engaged with a respective third worm screw installed on the auxiliary support assembly perpendicular to the longitudinal axis of the tubular covering sleeve, and
wherein each third worm screw supports a lead nut mounted on the respective main support assembly.

16. The apparatus of claim 15, wherein a belt drive connects each third main motor to the respective third worm screw.

17. The apparatus of claim 4, wherein the radially internal body comprises:
a central element having an ogive-shaped distal end; and
an outer tubular element disposed around the central element;
wherein the outer tubular element has a tapered distal end axially movable relative to the central element.

18. The apparatus of claim 17, wherein the radially internal body further comprises:
at least one intermediate tubular element disposed between the central element and the outer tubular element;
wherein the at least one intermediate tubular element has a tapered distal end axially movable relative to the central element and the outer tubular element.

19. The apparatus of claim 18, wherein the central element, the at least one intermediate tubular element, and the outer tubular element are mutually movable between a first operating configuration, at which the ogive-shaped distal end and the tapered distal ends form a substantially conical continuous surface, and a second operating configuration, at which a point of the ogive-shaped end and edges of the tapered distal ends lie in a same plane.

20. The apparatus of claim 18, wherein keys are disposed between the central element, the at least one intermediate tubular element, and the outer tubular element to prevent mutual rotation of the central element, the at least one intermediate tubular element, and the outer tubular element.

21. The apparatus of claim 18, wherein the drivers comprise:
at least one pair of first auxiliary motors;
at least one pair of second auxiliary motors;
and a pair of third auxiliary motors;
wherein each first auxiliary motor is connected with an outer tubular element of a respective radially internal body,
wherein each second auxiliary motor is connected to an intermediate tubular element of the respective radially internal body, and
wherein each third auxiliary motor is connected to a central element of the respective radially internal body,
wherein the first, second, and third auxiliary motors move the outer tubular element, the at least one intermediate tubular element, and the central element in a direction opposite to a moving forward direction of the respective radially external tubular body in the tubular covering sleeve, so as to first bring the ogive-shaped distal ends of the central elements into mutual contact, then bring the tapered distal ends of the outer tubular element, and the at least one intermediate tubular element into mutual contact, and finally bring distal ends of the radially external tubular bodies into mutual contact.

22. The apparatus of claim 21, wherein each radially internal body, the respective first auxiliary motor, the respective second auxiliary motor, and the respective at least one third auxiliary motor are installed on a main support assembly that is movable between a disengaged position, at which the radially internal body lies spaced apart from the respective radially external tubular body, and an engaged position, at which the radially internal body is inserted in the respective radially external tubular body.

23. The apparatus of claim 22, wherein the outer tubular element of the radially internal body is provided, on a proximal end thereof, with an outer thread engaged by a lead nut rotatably mounted on the main support assembly and connected to the respective first auxiliary motor.

24. The apparatus of claim 23, wherein a belt drive connects the respective first auxiliary motor to a respective lead nut.

25. The apparatus of claim 23, wherein the respective first auxiliary motor is fixed relative to the main support assembly.

26. The apparatus of claim 21, wherein the at least one intermediate tubular element of the radially internal body is provided, on a proximal end thereof, with an outer thread engaged by a lead nut rotatably mounted on the outer tubular element and connected to the respective second auxiliary motor.

27. The apparatus of claim 26, wherein a belt drive connects the respective second auxiliary motor to a respective lead nut.

28. The apparatus of claim 26, wherein the respective second auxiliary motor is movable relative to the main support assembly together with the respective outer tubular element.

29. The apparatus of claim 21, wherein the central element of the radially internal body is provided, on a proximal end thereof, with an outer thread engaged by a lead nut slidably mounted on a proximal end of the intermediate tubular element and connected to the respective third auxiliary motor.

30. The apparatus of claim 29, wherein a belt drive connects the respective third auxiliary motor to a respective lead nut.

31. The apparatus of claim 29, wherein the respective third auxiliary motor is movable relative to the main support assembly together with the respective intermediate tubular element.

* * * * *